Oct. 28, 1958  H. J. SCHWERDHOFER  2,857,785
DRIVER FOR MULTI-SPEED HUB
Filed Feb. 21, 1957

INVENTOR:
HANS JOACHIM SCHWERDHOFER

ATTYS

United States Patent Office 2,857,785
Patented Oct. 28, 1958

2,857,785
DRIVER FOR MULTI-SPEED HUB

Hans Joachim Schwerdhofer, Schweinfurt (Main), Germany, assignor to Fichtel & Sachs A. G., Schweinfurt (Main), Bavaria, Germany Application February 21, 1957, Serial No. 641,618

Claims priority, application Germany February 28, 1956

5 Claims. (Cl. 74—750)

The present invention relates to a novel multi-speed transmission hub especially suited for bicycles. More particularly, it relates to a hub provided with simplified driving and shifting mechanisms, and the hub can also include a conventional braking mechanism.

In multi-speed transmission hubs the drive is generally effected by an impeller in operative engagement with a displaceable driver. The driver effects the transmission of power in all gears for drive and brake, and at the same time connects the various drive members. In hill-climbing gear, furthermore, one drive lock must be disconnected. In the presently known constructions, the driver is provided with four lugs, and the impeller with the same number of slots. Two of the lugs serve for the transmission of power, while the two other lugs effect the shifting of gears.

It is an object of the present invention to simplify the driver by reducing the number of lugs thereon.

It is a further object of the invention to provide a driver having but two lugs which effect both the transmission of power and the shifting of gears.

Still another object of the invention is to provide a simplified driver-impeller arrangement which is more rugged and resistant to damage without special tempering procedures.

In accordance with the present invention the driver is provided with two diametrically opposed lugs which effect both the transmission of power and the shifting of gears. The seats in the impeller for receiving these lugs are aligned and can be formed as a single continuous slot in only a single milling operation. The provision of but one slot also serves to strengthen the impeller and the cost of manufacture of both the driver and impeller is reduced.

By suitably shaping the driver, i. e., by stepping off that portion of the driver surface which effects shifting as opposed to the portion of the driver surface which effects power transmission, the high edge pressures on the impeller slot are eliminated and the slot therefore needs not be chamfered and hardened as would otherwise be necessary to avoid breaking at the edges when subjected to stress.

A preferred embodiment of the invention will now be described more fully with reference to the accompanying drawing, wherein.

Figure 1:
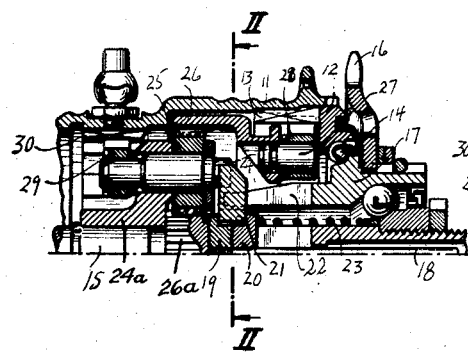
Fig. 1 shows a portion of the top half of a three-speed transmission hub in longitudinal section.

Referring now more particularly to the drawing, in Fig. 1 there is shown a bicycle hub casing 11 to which there is secured at the right hand end an annular member 12 provided with cam-like projections 13. The casing 11 and member 12 are supported by ball bearings 14 for rotation about axle 15.

A sprocket wheel 16 is adapted to be driven by the the pedals of the bicycle (not shown) and in turn drives an impeller 17 extending into the interior of casing 11. A chain (not shown) extends from the gear shifting lever at the bicycle handlebar (not shown) to one end of a rod 18 which extends into the casing 11. The other end of the rod 18 is connected to a pair of blocks 19, 20 defining therebetween a seat for a driver 21 which has two lugs extending into a slot 22 provided therefor in the annular end of impeller 17.

A helical spring 23 urges the blocks 19, 20 as far to the left as the rod 18 will allow in each given gear position. As shown, the driver 21 extends into the range of pins 24 so that upon rotation of sprocket wheel 16 the driver 21 causes the pins 24 to rotate together with the planet gears 25 supported thereon. The pins 24 are mounted on a rotatable spider 24a. A principal gear, viz., internally toothed gear 26, meshes with gears 25 and also rotates. Pins 27 which are carried along by the ring gear 26 have pivotally mounted thereon pawls 28 which mesh with projections 13 thereby to couple the principal gear 26 with the hub casing 11 for rotation of the latter.

Figure 3:
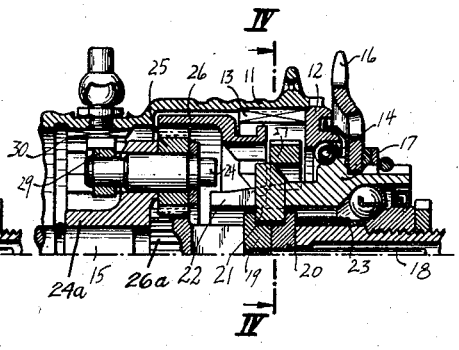
Fig. 3 shows a longitudinal section of the same hub in the hill-climbing position.

When shifting into low, or hill-climbing gear, the rod 18 is displaced to the right against the action of spring 23 into the position shown in Fig. 3, carrying the blocks 19, 20 and driver 21 therewith. The driver 21 then no longer extends into the range of pins 24 but instead extends into the range of the right-hand end of ring gear 26.

At the same time the right-hand side of the driver 21 contacts the pawls 28 and pivots them so that they no longer contact projections 13. As a result, the drive cannot take place through projections 13 but instead takes place from the impeller 17 via the driver 21, the ring gear 26, the planet gears 25, the pins 24, and the pawls 29 at the left-hand end of pins 24, the pawls 29 engaging projections 30 also coupled with the hub casing 11.

When the driver 21 is shifted to an intermediate position it establishes the intermediate driving speed. The driver engages and drives the internal toothed gear 26 but not the pins 24. The hub 11 is, therefore, driven from the driver through gear 26, the pins 27, the pawls 28 and the projections 13 on the member 12. A driving connection is still maintained from the driver 21 through the gear 26, planet gears 25, spider 24a, and pins 24 to pawls 29, but since the pawls 29 tend to drive the hub 11 at a slower rotary speed than the pawls 28, the hub overruns the pawls 29.

In high gear, the position of Figure 1, the effective drive is from the driver 21 through the pins 24, the spider 24a, the planet gears 25, the internal gears 26, the pins 27 and the pawls 28. Again the pawls 29 are driven, but again they are overrun by the hub because of the higher drive ratio of the pawls 28.

Thus, the new configuration of the driver permits it to effect both disengagement of pawls 28 for gear shifting or disconnection, and coupling with ring gear 26 for power transmission. Manufacture of the impeller is at the same time simplified since only a single continuous slot need be formed. It follows that removal of less material in forming but one slot also serves to leave the impeller stronger than was previously the case.

Figure 2:
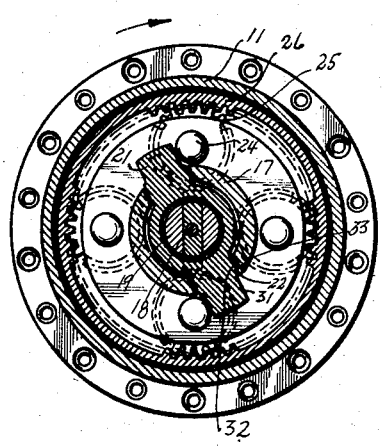
Fig. 2 shows a section along the line II—II of Fig. 1.
Figure 4:
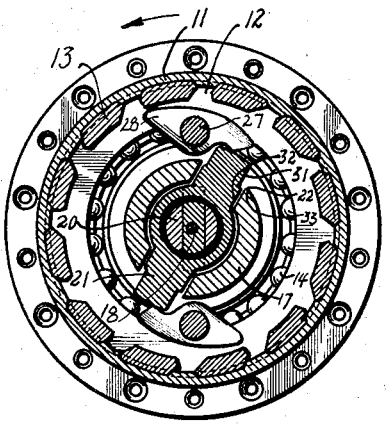
Fig. 4 is a section through the hub along the line IV—IV of Fig. 3.

As can be seen in Figs. 2 and 4, the outermost portions 31 of the surface of the driver 21 are stepped off relative to the adjacent portions 32 which extend through the slot 22 provided in the impeller 17. Because of the depth of the steps, the outermost edges 33 of the impeller adjacent the slot 22 are out of contact with the driver and thus are not subject to breaking. Whereas it was heretofore necessary to harden the impeller to avoid breakage at these edges, the novel configuration of the driver of itself eliminates this problem and thus further simplifies manufacture.

Various changes and modifications may be made without departing from the spirit and scope of the present invention and it is intended that such obvious changes and modifications be considered within the purview of the annexed claims.

What is claimed is:

1. In a multi-speed hub including a rotatable hub casing; a principal gear disposed within said casing, a pair of displaceable coupling means for selectively coupling said principal gear with said casing for rotation of the latter, a driver operatively connected with said principal gear in at least one of a plurality of driving positions, an impeller connected with said driver for rotating the latter from a location outside of said casing, and displacing means operatively connected with said driver, whereby upon actuation of said displacing means said driver is shifted from a first position in which it is operatively connected with said principal gear and in which one of said coupling means connects said principal gear with said casing into a second position in which said driver is differently operatively connected with said principal gear and in which the other of said coupling means connects said principal gear with said casing, displacement of said driver into said second position simultaneously effecting displacement of said one coupling means to terminate the first connection between said principal gear and said casing.

2. A multi-speed hub as defined in claim 1, wherein said driver has only two lugs.

3. A multi-speed hub as defined in claim 2, wherein the two lugs of said driver are oppositely directed and said impeller is provided with a single continuous slot beyond which said lugs of said driver extend in both directions.

4. A multi-speed hub as defined in claim 1, wherein said impeller has an annular portion provided with a single continuous transverse slot forming two seats, and said driver is provided with two oppositely directed lugs, said driver being received in said impeller with said lugs extending through and beyond said seats of said impeller, the surface portions of said lugs from the ends thereof to a position just inwardly of the outermost periphery of said impeller being stepped off relative to the surface portions which contact the edges of said impeller defining said seats, the tendency for said edges to break thus being avoided.

5. In a multi-speed hub including a rotatable hub casing: an internal toothed gear disposed within said casing and provided with first pin means having first pawl means pivotally mounted thereon; planet gears disposed within said casing and engaging said sun gear, said planet gears being provided with second pin means having second pawl means pivotally mounted thereon; a driver operatively connected with said planet gears in one position; an impeller for rotating said driver from without said casing, whereby said driver rotates said planet gears to rotate in turn said internal toothed gear, said first pin means and said hub casing through the intermediary of said first pawl means; and rod means for displacing said driver to a position in which the latter is operatively connected with said internal toothed gear, the driver being guided by engagement with the internal toothed gear so that displacement of said driver effects pivoting of said first pawl means to an inactive condition and thereby simultaneously enables low speed transmission of power to be effected to said hub casing through said internal toothed gear, said planet gears, said second pin means and said second pawl means.

References Cited in the file of this patent
UNITED STATES PATENTS
2,799,183    Rhein et al. _____ July 16, 1957